3,839,470
PROCESS FOR THE ISOMERISATION AND
TRANSALKYLATION OF PHENOLS
Efim Biller, Chemin Ritter, Fribourg, Switzerland, assignor to Union Rheinische Braunkohlen Kraftstoff Aktiengesellschaft, Cologne, Germany
No Drawing. Filed Apr. 25, 1969, Ser. No. 819,437
Claims priority, application Germany, May 10, 1968,
P 17 68 411.6
Int. Cl. C07c 39/06
U.S. Cl. 260—624 E       1 Claim

ABSTRACT OF THE DISCLOSURE

Isomerisation of alkyl phenols and transalkylation of alkyl phenol/phenol mixtures by reacting the alkyl phenols at a temperature of from about 150 to 250° C. in the presence of an aqueous solution of zinc chloride or zinc bromide and a corresponding hydrogen halide or in the presence of methane sulfonic acid.

This invention relates to a process for the isomerisation and transalkylation of lower alkyl phenols, by means of which the *meta*-isomers are preferentially formed.

In the reaction of phenol with alkylating agents such as alcohols or olefins with 1 to about 5 carbon atoms in the presence of a conventional alkylating catalyst, substitution frequently takes place preferentially in the *ortho*-position. Mixtures are formed which contain monoalkyl phenols, comprising mainly the *ortho*-isomer in addition to more or less large quantities of *para*-isomers, and dialkyl phenols, the 2,6-dialkyl phenol and the 2,4-dialkyl phenol in particular. In many instances, the *meta*-isomers are obtained in the products only in limited quantities amounting to a few percent. For many uses however, for example for the production of synthetic resins, a high content of the *meta*-isomer is desired.

It has now been found that alkyl phenols containing only small quantities of the *meta*-isomer, can be isomerised and alkyl phenol/phenol mixtures can be transalkylated into mixtures containing large quantities of the *meta*-isomer by heating the alkyl phenol or alkyl phenol/phenol mixture at a temperature of from about 150 to 250° C. in the presence of an aqueous solution of a zinc chloride or zinc bromide and a corresponding hydrogen halide or in the presence of methane sulfonic acid.

The reaction may be carried out under an elevated pressure up to about 100 atm. The composition of the catalyst solution may vary within wide limits. Water contents of from 1 to 10 mols and hydrogen halide contents of from 0.02 to 1 mol per mol of zinc halide are generally of advantage. Since the catalyst solution can readily be separated from the reaction product, for example by washing with water, and restored to the required concentration by distillation, it is of advantage in some instances to use relatively large quantities of catalyst solution, for example 20% by weight and more, based on the alkyl phenol used. The same also applies as regards the use of methane sulfonic acid as catalyst.

It may be useful to add an inert organic diluent to the reaction product after cooling to improve the separation of the organic layer from the wash water containing the catalyst. Suitable diluents are i.e. heptane, cyclohexane, which may be removed from the separated organic layer by distillation. The crude alkylate obtained can be worked of in known manner preferably by distillation.

EXAMPLE 1

A mixture of 272 g. of *o*-isopropyl phenol (2 mols) and 50 g. of a catalyst solution comprising 1 mol of zinc bromide, 2.5 mols of water and 0.2 mol of hydrogen bromide was heated for 1 hour at 220° C. and under a pressure of about 3 atm. in a pressure vessel. After cooling the reaction product was diluted with 50% by volume of heptane, the catalyst was removed by washing three times, each with 30 cc. of water and the heptane was distilled off. There were obtained 315 g. of alkylate the analysis of which by gas chromatography revealed the following composition:

|  | Percent |
|---|---|
| Phenol | 22.2 |
| *o*-Isopropyl phenol | 8.6 |
| *m*-Isopropyl phenol | 26.5 |
| *p*-Isopropyl phenol | 16.1 |
| 2,6-diisopropyl phenol | 0.9 |
| 2,4- and 2,5-diisopropyl phenol | 13.8 |
| 3,5-diisopropyl phenol | 10.0 |
| Higher-boiling compounds | 1.9 |

EXAMPLE 2

The procedure was as described in Example 1, except that the reaction was carried out at a temperature of 165° C. and under normal pressure in the presence of a catalyst solution comprising 1 mol of zinc bromide, 4 mols of water and 0.5 mol of hydrogen bromide. The reaction time required to produce the same proportion of the *meta*-isomer as in Example 1 was lengthened to 5 hours.

EXAMPLE 3

176 g. of diisopropyl phenol (1 mol) and 141 g. of phenol (1.5 mols) corresponding to a phenol/propylene molar ratio of 1:0.8, and 60 g. of a catalyst solution with the same composition as that used in Example 1, were heated for 2 hours at 180° C. in a pressure autoclave. The reaction product was worked-up as described in Example 1. Analysis by gas chromatography of the alkylate revealed the following composition:

|  | Percent |
|---|---|
| Phenol | 16.1 |
| *o*-Isopropyl phenol | 11.6 |
| *m*-Isopropyl phenol | 31.3 |
| *p*-Isopropyl phenol | 20.1 |
| 2,6-diisopropyl phenol | 0.6 |
| 2,4- and 2,5-diisopropyl phenol | 14.0 |
| 3,5-diisopropyl phenol | 6.3 |

EXAMPLE 4

The procedure was as described in Example 3 except that, instead of diisopropyl phenol 204 g. of 2,6-di-sec.-butyl phenol was used. The crude alkylate (340 g.) worked-up as described in Example 1 had the following composition:

|  | Percent |
|---|---|
| Phenol | 18.0 |
| *o*-Sec.-butyl phenol | 10.0 |
| *m*-Sec.-butyl phenol | 28.0 |
| *p*-Sem.-butyl phenol | 22.0 |
| 2,6-di-sec.-butyl phenol | 0.3 |
| 2,4- and 2,5-di-sec.-butyl phenol | 16.0 |
| 3,5-di-sec.-butyl phenol | 5.7 |

EXAMPLE 5

*o*-Isopropyl phenol was isomerised for 5 hours at 185–200° C. and under normal pressure in the presence of 30% of methane sulfonic acid. The isopropyl phenol obtained in the crude alkylate comprised 20.4% of *ortho*-isomer
27.8% of *para*-isomer and
51.8% of *meta*-isomer.

What I claim is:

1. A process for producing meta-alkyl phenols selected from the group consisting of metapropylphenol and metabutylphenol which comprises heating an alkyl phenol selected from the group consisting of isopropyl phenol, isobutyl phenol, a mixture of diisopropyl phenol with phenol and a mixture of diisobutyl phenol with phenol where the propyl and butyl groups are substituted in the o-position on the phenol nucleus, at a temperature of from about 150° C. to 250° C. in the presence of an aqueous catalyst selected from the group consisting of
  (1) a solution of 1–10 mols of water per mol of zinc chloride with from 0.02 to 1 mol of hydrogen chloride and
  (2) a solution of 1–10 mols of water per mol of zinc bromide with from 0.02 to 1 mol of hydrogen bromide; to thus produce a reaction product having a high proportion of m-isopropylphenol or m-isobutylphenol and then recovering the m-isopropyl phenol or m-isobutylphenol from the reaction mixture obtained.

References Cited

UNITED STATES PATENTS

| | | | |
|---|---|---|---|
| 1,876,435 | 9/1932 | Schollkopf et al. | 260—621 E |
| 1,972,599 | 10/1934 | Perkins | 260—621 E |
| 2,206,924 | 7/1940 | Stevens | 260—624 E |
| 3,014,079 | 12/1961 | Olin | 260—624 E |
| 3,116,336 | 12/1963 | Van Winkle | 260—624 E |
| 3,534,111 | 10/1970 | Hess | 260—624 E |

FOREIGN PATENTS

| | | | |
|---|---|---|---|
| 555,751 | 9/1943 | Great Britain | 260—621 E |
| 1,112,502 | 5/1968 | Great Britain | 260—621 E |
| 969,237 | 9/1964 | Great Britain | 260—624 E |
| 906,219 | 2/1961 | Great Britain | 260—624 E |

OTHER REFERENCES

Braddeley, "J. Chemical Society (London)," pp. 994 through 997 (1950).

Perrin et al., Compte Rend Academy of Science, Tome 26B, Dec. 19, 1966, pp. 1473–76.

BERNARD HELFIN, Primary Examiner

W. B. LONE, Assistant Examiner

U.S. Cl. X.R.

260—626, 624 C